(12) United States Patent
Liu et al.

(10) Patent No.: US 10,784,758 B2
(45) Date of Patent: Sep. 22, 2020

(54) LINEAR VIBRATION MOTOR

(71) Applicant: GOERTEK INC., WeiFang, Shandong (CN)

(72) Inventors: Chunfa Liu, Shandong (CN); Fenglei Zu, Shandong (CN)

(73) Assignee: GOERTEK INC., Weifang (CN)

( * ) Notice: Subject to any disclaimer, the term of this patent is extended or adjusted under 35 U.S.C. 154(b) by 181 days.

(21) Appl. No.: 15/778,639

(22) PCT Filed: May 19, 2016

(86) PCT No.: PCT/CN2016/082566
§ 371 (c)(1),
(2) Date: May 24, 2018

(87) PCT Pub. No.: WO2017/088367
PCT Pub. Date: Jun. 1, 2017

(65) Prior Publication Data
US 2018/0351443 A1     Dec. 6, 2018

(30) Foreign Application Priority Data
Nov. 25, 2015   (CN) .......................... 2015 1 0835619

(51) Int. Cl.
*H02K 33/14* (2006.01)
*H02K 33/16* (2006.01)
*H02K 33/18* (2006.01)

(52) U.S. Cl.
CPC ............. *H02K 33/14* (2013.01); *H02K 33/16* (2013.01); *H02K 33/18* (2013.01)

(58) Field of Classification Search
CPC ......... H02K 33/14; H02K 33/18; H02K 33/16
(Continued)

(56) References Cited

U.S. PATENT DOCUMENTS

2012/0169148 A1* 7/2012 Kim ..................... H02K 33/16
310/25
2012/0227269 A1* 9/2012 Subramanian ........ B26B 19/282
30/210
(Continued)

FOREIGN PATENT DOCUMENTS

CN      201789399 A      4/2011
CN      202068311 A     12/2011
(Continued)

OTHER PUBLICATIONS

International Search Report from International Application No. PCT/CN2016/082506 dated Aug. 31, 2016.
(Continued)

*Primary Examiner* — Naishadh N Desai
(74) *Attorney, Agent, or Firm* — Brundidge & Stanger, P.C.

(57) ABSTRACT

Disclosed is a linear vibration motor, comprising a vibrator and a stator, the vibrator comprises a counterweight block and a vibration block, the vibration block includes at least two magnets adjacently arranged and a magnetic conductive yoke disposed between any two adjacent magnets, and polarities of adjacent ends of two adjacent magnets are the same. The magnets are any combination of a permanent magnet and/or an electromagnet. The stator includes a stator coil disposed at one side, or upper and lower sides of the vibrator, and a magnetic conductive core disposed in the stator coil, and the axis direction of the stator coil is perpendicular to the magnetization direction of the magnets. The linear vibration motor adopts free combinations of permanent magnets and electromagnets to constitute the vibration block, and thus expands the implementation manners of the linear vibration motor so as to improve the flexibility in the production process.

9 Claims, 10 Drawing Sheets

(58) Field of Classification Search
USPC .................................. 310/15, 17, 25, 28, 29
See application file for complete search history.

(56) References Cited

U.S. PATENT DOCUMENTS

| | | | | |
|---|---|---|---|---|
| 2013/0033128 | A1* | 2/2013 | Yoon | H02K 33/16 |
| | | | | 310/25 |
| 2014/0152126 | A1* | 6/2014 | Kim | B06B 1/045 |
| | | | | 310/25 |
| 2016/0181904 | A1* | 6/2016 | Zhang | H02K 33/12 |
| | | | | 310/17 |

FOREIGN PATENT DOCUMENTS

| | | |
|---|---|---|
| CN | 102570764 A | 7/2012 |
| CN | 203416119 A | 1/2014 |
| CN | 103855856 A | 6/2014 |
| CN | 104617736 A | 5/2015 |
| CN | 104660004 A | 5/2015 |
| CN | 104660106 A | 5/2015 |
| CN | 104682656 A | 6/2015 |
| CN | 105048757 A | 11/2015 |
| CN | 105207442 A | 12/2015 |
| CN | 105281528 A | 1/2016 |
| CN | 205092752 A | 3/2016 |
| CN | 205847046 U | 12/2016 |
| EP | 2608373 A1 | 6/2013 |
| JP | H08116658 A | 5/1996 |

OTHER PUBLICATIONS

Chinese Office Action dated May 17, 2017.
Chinese Office Action dated Jan. 16, 2018.

* cited by examiner

LINEAR VIBRATION MOTOR

TECHNICAL FIELD

The present invention relates to the field of consumer electronics technology, and more particularly, to a linear vibration motor applied to a portable consumer electronic product.

BACKGROUND ART

With the development of communication technology, portable electronic products such as mobile phones, handheld game players, or handheld multimedia entertainment devices have come up into people's lives. In these portable electronic products, micro vibration motors are generally used for providing system feedback, such as call prompts of mobile phones, vibration feedback of game players, and the like. However, with lightening and thinning development tendency of electronic products, various internal components of the electronic products are required to adapt to this tendency, and so is the micro vibration motors.

The existing micro vibration motors generally include a housing that forms a vibration space, a vibrator (including a counterweight block and a permanent magnet) that vibrates linearly and reciprocally in the vibration space, and a stator that cooperates with the vibrator.

The vibration principle of the micro vibration motor is that: the permanent magnet of the vibrator generates a magnetic field, and the stator coil located in the magnetic field is subjected to force; because the stator is relatively fixed, the vibrator will move in a certain direction driven by the reacting force; if the direction of the current in the stator coil is changed, the vibrator will move in the opposite direction, and thus generates vibration.

However, in the conventional micro vibration motors, the vibrator is generally composed of a permanent magnet, lacks flexibility in implementation manners, and due to the processing method and the specific magnetic characteristics of the permanent magnet, it is not easy to make an improvement in the driving magnetic field of the micro vibration motor by modifying the vibrator; meanwhile, due to the limited internal space of the micro vibration motor, the volume of the magnet that can be accommodated in a the limited internal space is also limited, and the magnetic force between the vibrator and the coil of the conventional vibration motor is also limited, and thus there is not much room for improvement in enhancing the vibration force of the vibrator, which goes against improving the vibration force of electronic products.

SUMMARY OF THE INVENTION

In view of the above defects, an object of the present invention is to provide a linear vibration motor which can adopts free combinations of permanent magnets and electromagnets to constitute the vibration block of the linear vibration motor, and thus significantly expands the implementation manners of the linear vibration motor so as to improve the flexibility in the production process of the linear vibration motor.

The present invention provides a linear vibration motor, comprising a vibrator and a stator disposed in parallel with the vibrator, the vibrator comprises a counterweight block and a vibration block embedded and fixed in the counterweight block, the vibration block includes at least two magnets disposed adjacent to each other and a magnetic conductive yoke disposed between any two adjacent magnets, and adjacent ends of any two adjacent magnets have the same polarities, wherein the magnets in the vibration block are any combination of a permanent magnet and/or an electromagnet; and the stator includes stator coil(s) disposed at one side of the vibrator or correspondingly disposed at upper and lower sides of the vibrator, and magnetic conductive core(s) disposed in the stator coil(s); and an axis direction of the stator coil(s) is perpendicular to a magnetization direction of the magnets of the vibration block.

Wherein, in a preferred embodiment, the vibration block includes three magnets disposed adjacent to each other; and the three magnets disposed adjacent to each other are electromagnets; or the three magnets disposed adjacent to each other are a permanent magnet, an electromagnet and a permanent magnet, respectively, or the three magnets disposed adjacent to each other are an electromagnet, a permanent magnet and an electromagnet, respectively.

Wherein, in a preferred embodiment, when the stator includes stator coils correspondingly disposed at upper and lower sides of the vibration block and magnetic conductive cores disposed in the stator coils, the stator coils correspondingly disposed at the upper and lower sides of the vibration block are parallel to each other and axes of the stator coils are located at the same straight line; and directions of currents in the stator coils correspondingly disposed at the upper and lower sides of the vibration block are reverse to each other.

Wherein, in a preferred embodiment, a horizontal distance d between each of the magnetic conductive yokes and the corresponding magnetic conductive core is within a numerical range of 0.1 mm to 0.3 mm.

Wherein, in a preferred embodiment, magnetic conductive fluid is filled between the vibration block and the stator.

Wherein, in a preferred embodiment, the counterweight block has an integral structure, and a receiving groove for receiving the vibration block is disposed at a middle portion of the counterweight block; and an avoiding structure for avoiding the stator is provided at a position of the counterweight block corresponding to the stator.

Wherein, in a preferred embodiment, the linear vibration motor further comprises a housing, the counterweight block has an integral structure, grooves are symmetrically arranged at two ends of the counterweight block, and push-pull magnets are received and fixed in the grooves, respectively; and push-pull coils surrounding the push-pull magnets are fixedly disposed on the housing at positions corresponding to the push-pull magnets, respectively.

Wherein, in a preferred embodiment, the linear vibration motor further comprises push-pull coil bobbins, and the push-pull coils are wound on the push-pull coil bobbins, respectively.

Wherein, in a preferred embodiment, two ends of the counterweight block are respectively provided with an elastic piece; and the elastic piece is limited between the vibrator and the housing.

Wherein, in a preferred embodiment, each of the push-pull magnets is a permanent magnet that is magnetized horizontally; or each of the push-pull magnets includes two permanent magnets disposed adjacent to each other and a magnetic conductive core disposed between the adjacent permanent magnets, and adjacent ends of the two adjacent permanent magnets have the same polarities.

The linear vibration motor according to the present invention gets out of prior motor design concept in which the vibration block is composed of permanent magnets, and adopts an arbitrary combination of a permanent magnet and an electromagnet to form the vibration block, and thus significantly expands the implementation manners of the linear vibration motor so as to improve the flexibility in the production process of the linear vibration motor.

To the accomplishment of the above and related objects, one or more aspects of the present invention include features which will be specifically described below and particularly depict in the claims. The following description and the annexed drawings set forth in detail certain illustrative aspects of the present invention. However, these aspects are only some of the various implementations to implement the principle of the present invention. In addition, the present invention is intended to include all such aspects and their equivalents.

BRIEF DESCRIPTION OF THE DRAWINGS

Other objects and results of the present invention will be more clearly understood by reading the following description referring to the drawings and the claims, and with a further understanding of the present invention. In the drawings:

Figure 1:
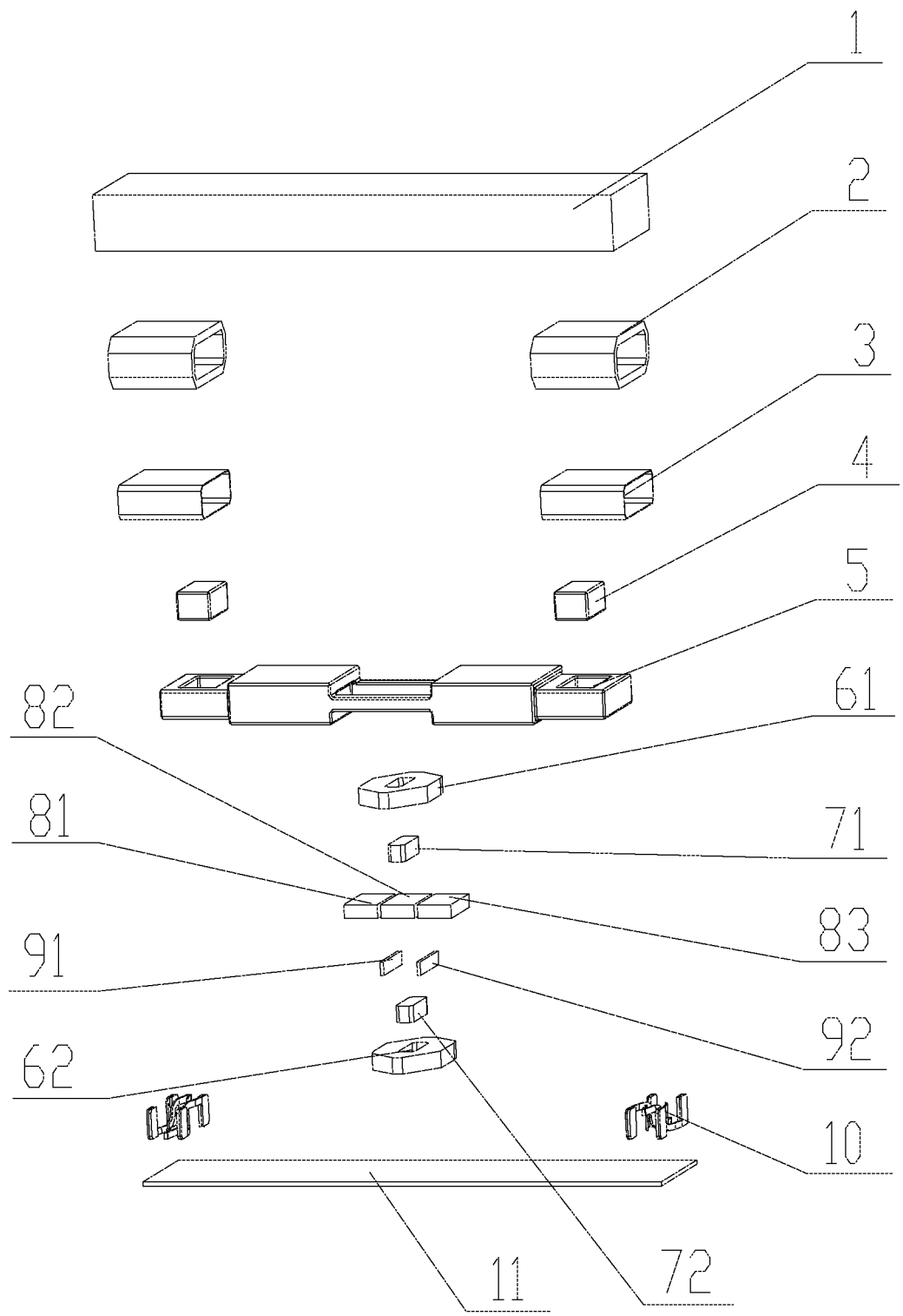
FIG. 1 is a schematic diagram of an exploded overall structure of a linear vibration motor according to a first embodiment of the present invention.

In the drawings: upper housing 1; lower cover 11; push-pull coil 2; coil bobbin 3; push-pull magnet 4; magnetic conductive block 42; counterweight block 5; groove 51; receiving groove 52; permanent magnets 81, 82, 83, 81', 82', and 83'; magnetic conductive yokes 91, 92, 91', and 92'; stator coils 61, 62, 61', and 62'; magnetic conductive cores 71, 72, 71', and 72'; elastic piece 10.

The same reference numbers indicate similar or corresponding features or functions throughout the appended drawings.

DETAILED DESCRIPTION OF THE EMBODIMENTS

In the following description, for the purposes of explanation, specific details are described in order to provide a full understanding of one or more embodiments. However, it will be apparent that these embodiments may also be practiced without these specific details. In other examples, in order to facilitate describing one or more embodiments, well-known structures and devices are shown in form of block.

The term "counterweight block" in the following description of specific embodiments may also be referred to as "mass block", and both of them refer to a high mass and high density metal block which is fixed to a vibration block that generates vibration for vibration balance.

In addition, the present invention is mainly focus on the improvement in micro vibration motors, but it does not exclude applying technology disclosed in the present invention to the large vibration motor. However, in order to facilitate describing, in the following description of the embodiments, "linear vibration motor" and "micro vibration motor" refer to the same thing.

Specific embodiments of the present invention will be described in detail below with reference to the accompanying drawings.

In order to solve the problem of poor motor design flexibility and limited vibration force due to the vibration block composed of permanent magnet in a conventional micro vibration motor structure, the linear vibration motor provided by the present invention can adopt free combinations of permanent magnets and electromagnets to constitute the vibration block of the linear vibration motor, and thus significantly expands the implementation manners of the linear vibration motor so as to improve the flexibility in the production process of the linear vibration motor, thereby enhancing the vibration force of the micro vibration motor.

The linear vibration motor provided by the present invention includes a vibrator and a stator disposed in parallel with the vibrator, the vibrator includes a counterweight block and a vibration block fixedly mounted in the counterweight block, and the vibration block includes at least two adjacently arranged magnets and magnetic conductive yokes disposed between adjacent magnets, and the adjacent ends of two adjacently arranged magnets having the same polarity; wherein the magnets in the vibration block are free combinations of permanent magnets and/or electromagnets; the stator includes stator coil(s) disposed at one side or both upper and lower sides of the vibrator, and magnetic conductive core(s) disposed in the stator coil(s); the axis direction of the stator coil is perpendicular to the magnetization direction of the magnet of the vibration block.

According to the design of the vibration block of the present invention, the magnet in the vibration block is not limited to a permanent magnet, which significantly expands the implementation manners of the vibration block and improves the flexibility in product design.

In other words, the present invention aims at generating magnetic field which capable of applying a force to the stator coil, and makes improvement in the composition of the vibration block, so that the magnets constituting the vibration block can be free combinations of the permanent magnets and the electromagnets. For example, in the case where three magnets constitute the vibration block, the combinations thereof may be that all of them are permanent magnets or all of them are electromagnets, or may be alternate combinations of permanent magnets and electromagnets: a permanent magnet, an electromagnet, and a permanent magnet, or, an electromagnet, a permanent magnet, and an electromagnet. It can also be the following combinations: a permanent magnet, a permanent magnet, and an electromagnet; an electromagnet, a permanent magnet, and a permanent magnet; an electromagnet, an electromagnet, and a permanent magnet; and a permanent magnet, an electromagnet, and an electromagnet, and the like.

The technical solution of the present invention will be described in more detail by the following three specific embodiments.

Specifically, FIG. 1, FIG. 2, and FIGS. 3a-3b are a schematic diagram of an exploded overall structure, a sectional view of an assembled structure, schematic diagrams illustrating the driving principle of a linear vibration motor according to a first embodiment of the present invention, respectively.

Figure 2:
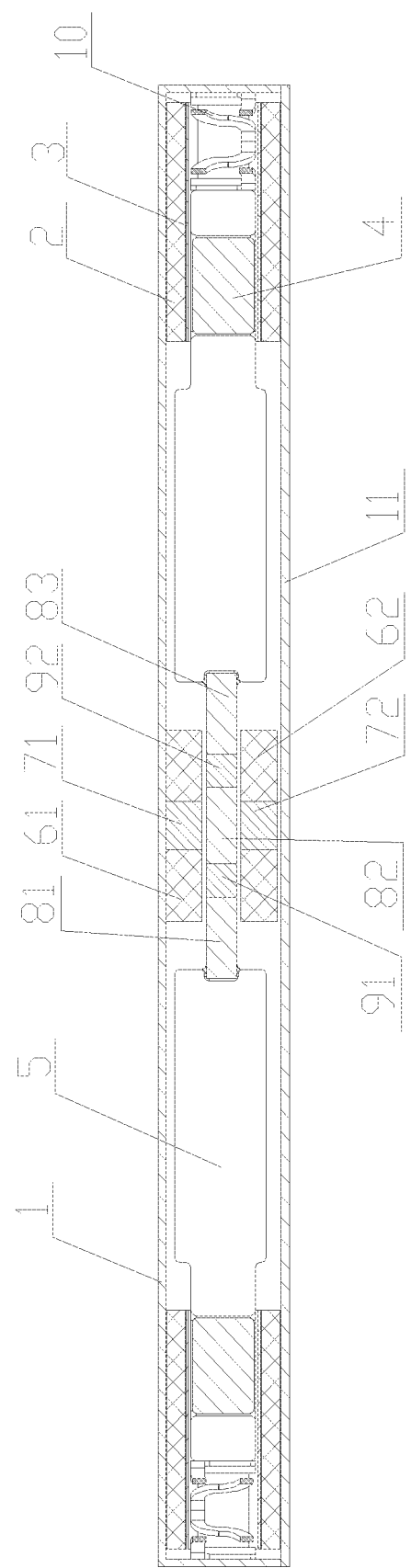
FIG. 2 is a sectional view of an assembled structure of the linear vibration motor according to the first embodiment of the present invention.

As shown in FIGS. 1 to 3, the combination manner of the vibration block in the linear vibration motor according to the first embodiment is a combination of three electromagnets sequentially disposed. Specifically, the linear vibration motor mainly includes a housing, a vibrator, and a stator fixed on the housing and disposed in parallel with the vibrator. Wherein, the housing comprises an upper housing 1 and a lower cover 11; the vibrator includes a counterweight block 5 and a vibration block embedded and fixed in the counterweight block 5, the vibration block comprises three electromagnets 81, 82, 83 disposed adjacent to each other, and two magnetic conductive yokes 91, 92 provided between adjacent electromagnets, and the adjacent ends of the three electromagnets disposed adjacent to each other have the same polarities. The stator includes stator coils 61 and 62 correspondingly disposed at the upper and lower sides of the vibration block, and magnetic conductive cores 71 and 72 respectively disposed in the stator coils 61 and 62. The magnetization direction of the permanent magnets in the vibration block and the axis direction of the stator coils are perpendicular to each other, and the magnetic conductive yokes in the vibration block and the magnetic conductive cores in the stator are misaligned.

Figure 3A:
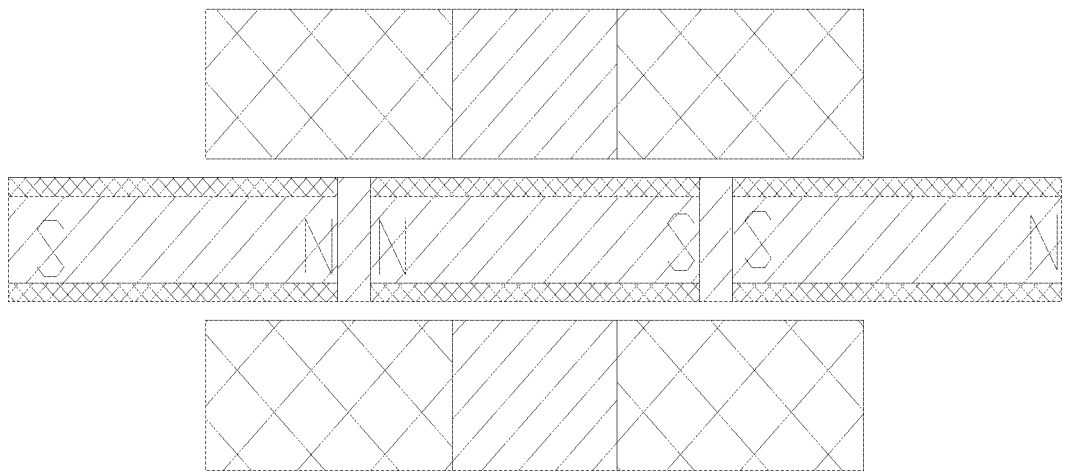
FIG. 3a and FIG. 3b are schematic diagrams illustrating the driving principle of the linear vibration motor according to the first embodiment of the present invention.
Figure 3B:
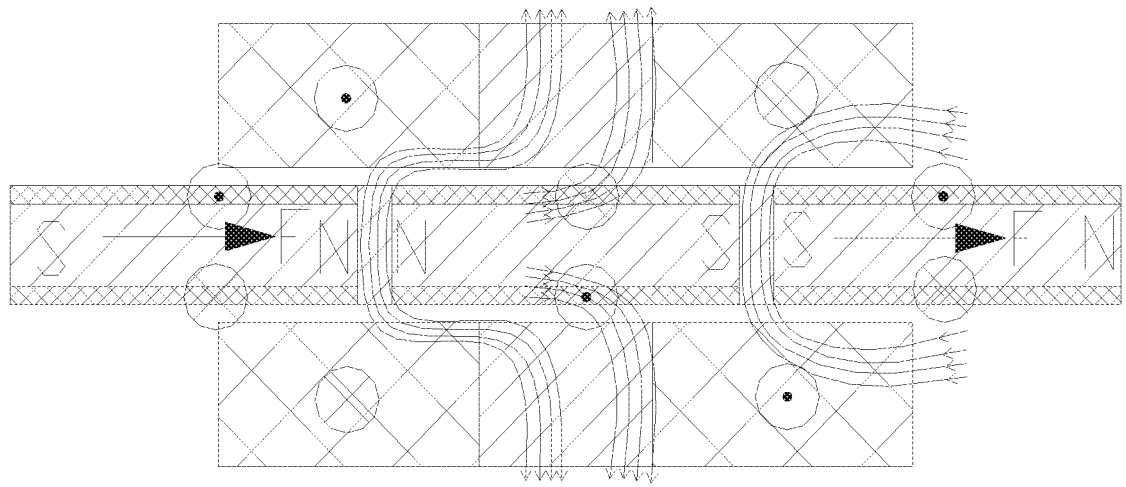

According to the schematic diagram of the vibration principle shown in FIGS. 3a and 3b, it can be seen that the charging directions of the three electromagnets composing the vibration block are alternatively reversed. That is, the charging directions of the adjacent electromagnets are reverse to each other. In the drawings, the direction of the current indicated by "⊙" is perpendicular to drawing plane and directed outward, and the current indicated by "⊗" is perpendicular to the drawing plane and directed inward. Thus, according to the right-hand rule, the three electromagnets constituting the vibration block illustrated in the drawings is arranged in the order of: S-N, N-S, and S-N. The magnetic field lines generated by the vibration block respectively pass through the stator coils vertically up and down. According to the left-hand rule determining the direction of force applied to a energized conductor in a magnetic field, open the left hand so that the thumb is perpendicular to the remaining four fingers and both of them are in the same plane as the palm; let the magnetic field lines generated by the middle vibration block pass through the hand from the palm, and the four fingers point to the direction of the current, then the direction of the thumb is the Ampere force applied on the energized wire (i.e., the stator coil) in the magnetic field generated by the permanent magnets of the vibration block. According to the direction of the current in the stator coil in FIG. 3b, the stator coil is subjected to a leftward force. Since the stator coil is fixed and immovable, the vibration block is subjected to a rightward force F based on the relationship between the acting force and the reacting force. In this way, when the vibration block is subjected to a rightward driving force, the vibration block move right horizontally along with the counterweight block. Similarly, when the direction of the current changes, according to the left-hand rule, the stator coil is subjected to a rightward magnetic force, and because the stator coil is fixed immovably, the vibration block is subjected to a leftward force with opposite direction and the same magnitude. The vibration block subject to the leftward driving force move left along with the counterweight block. The above-mentioned movements are alternately performed to drive the micro vibration motor to vibrate.

Figure 4:
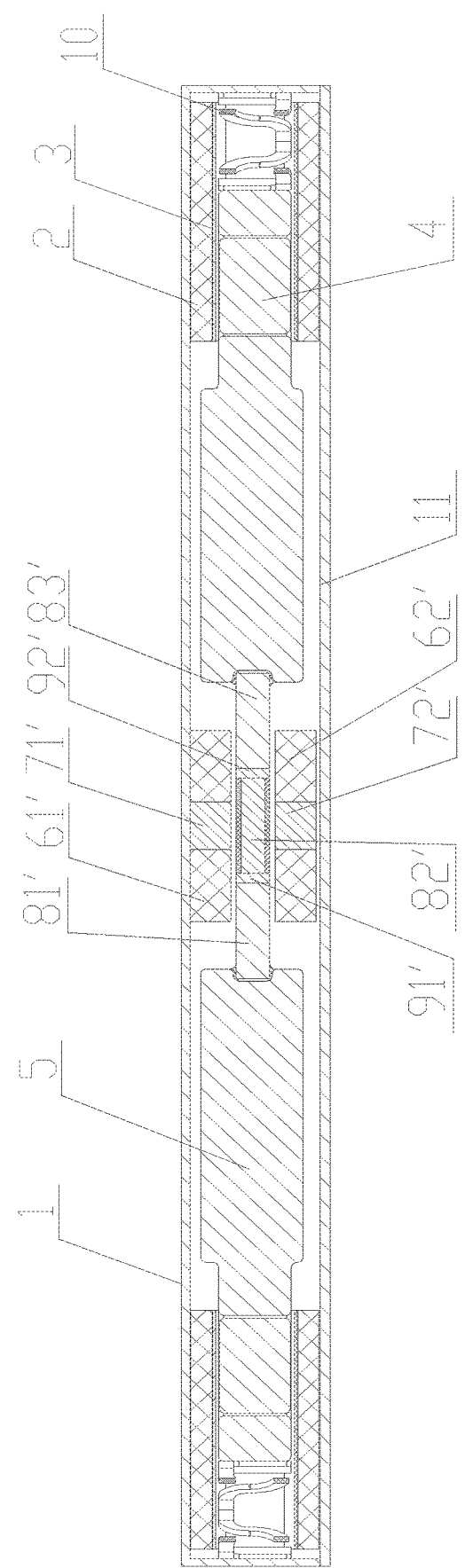
FIG. 4 is a sectional view of an assembled structure of a linear vibration motor according to a second embodiment of the present invention.
Figure 5A:
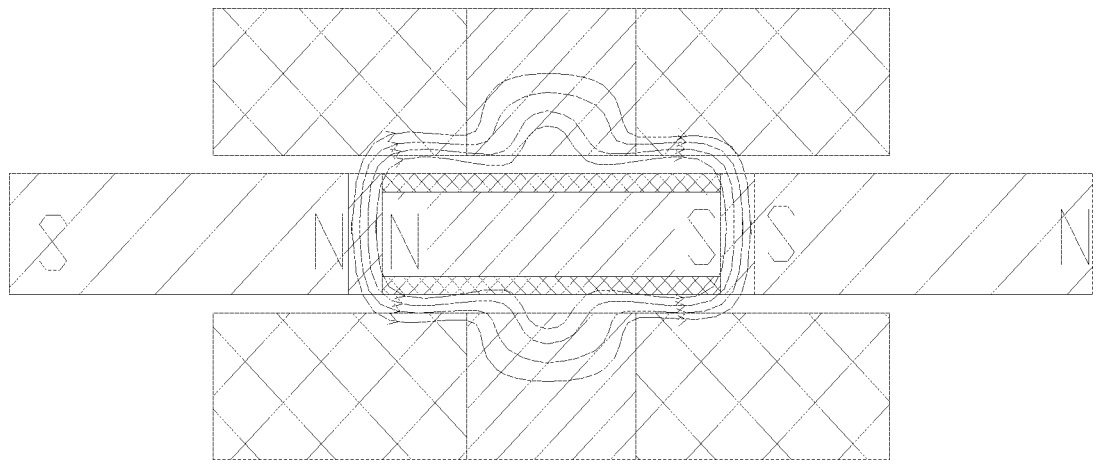
FIG. 5a and FIG. 5b are schematic diagrams illustrating the driving principle of the linear vibration motor according to the second embodiment of the present invention.
Figure 5B:
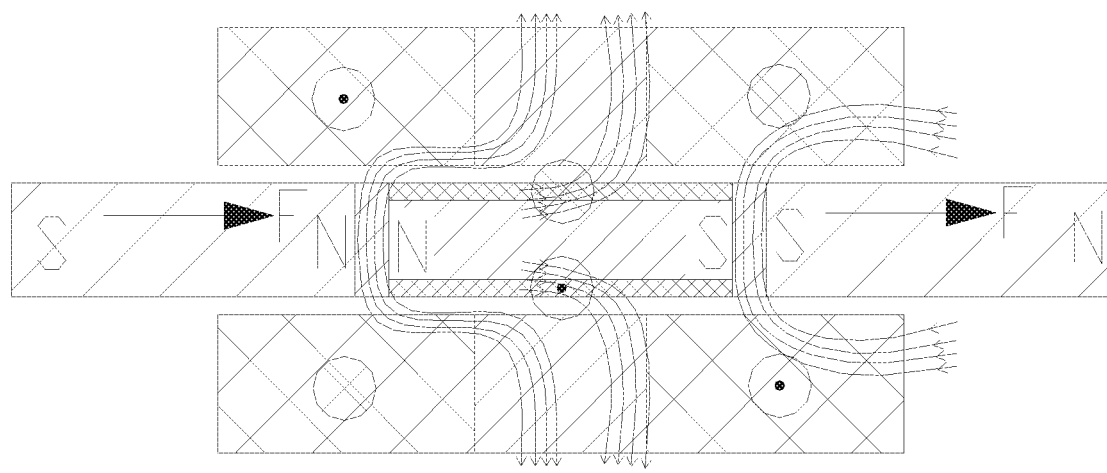

FIG. 4 and FIGS. 5a-5b respectively show a cross-sectional view of an assembled structure and the driving principle of a linear vibration motor according to a second embodiment of the present invention.

As shown in FIG. 4, the linear vibration motor according to the second embodiment also includes a housing, a vibrator, and a stator. The stator is fixed on the housing and is disposed parallel to the vibrator. Wherein, the housing includes an upper housing 1 and a lower cover 11, the vibrator includes a counterweight block 5 and a vibration block embedded and fixed in the counterweight block 5, and the vibration block includes three magnets 81', 82', 83' disposed adjacent to each other, and two magnetic conductive yokes 91', 92' disposed between adjacent electromagnets, and the adjacent ends of the three electromagnets disposed adjacent to each other have the same polarities. The stator includes stator coils 61', 62' correspondingly disposed at upper and lower sides of the vibration block, and magnetic conductive cores 71', 72' respectively disposed in the stator coils 61', 62'. The magnetization direction of the permanent magnets in the vibration block and the axis direction of the stator coil are perpendicular to each other.

Different from the first embodiment, in the second embodiment, the three magnets constituting the vibration block are a permanent magnet, an electromagnet, and a permanent magnet, i.e., the magnets 81', 83' are permanent magnets, and the magnet 82' is an electromagnet. According to the schematic diagram of the vibration principle shown in FIGS. 5a and 5b, it can be seen that the charging direction of the middle electromagnet constituting the vibration block is configured such that the adjacent ends of the electromagnet and any one of the two permanent magnets have the same polarities. That is, the three electromagnets constituting the vibration block illustrated in the drawings are arranged in the order of S-N, N-S, and S-N. The vibration principle thereof is the same as the vibration principle of the first embodiment.

Figure 6:
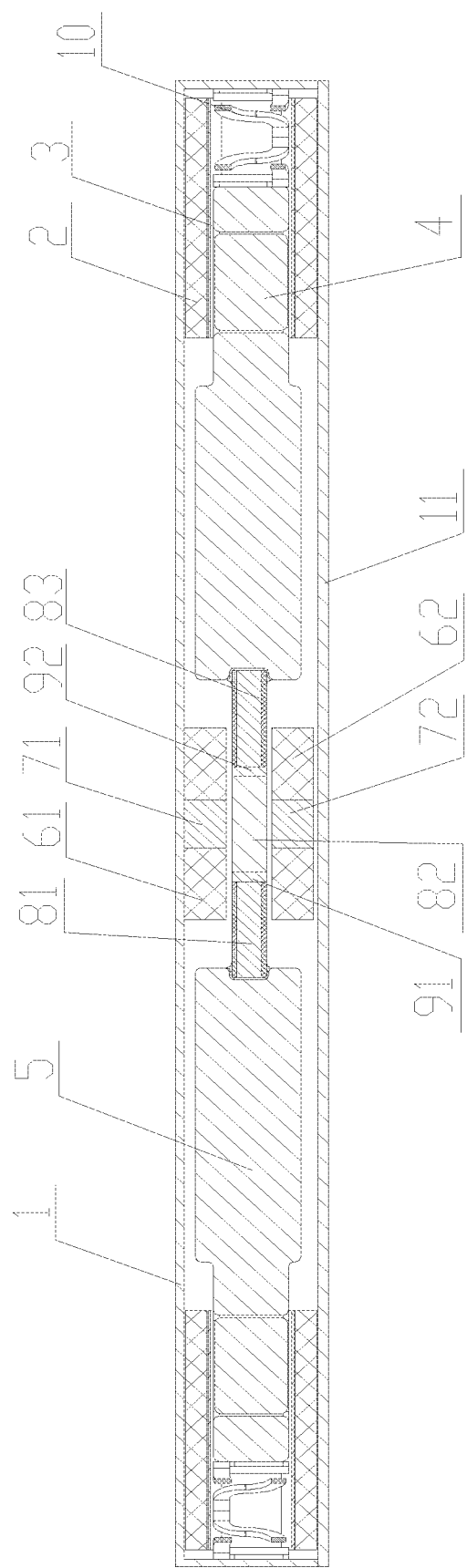
FIG. 6 is a sectional view of an assembled structure of a linear vibration motor according to a third embodiment of the present invention.
Figure 7A:
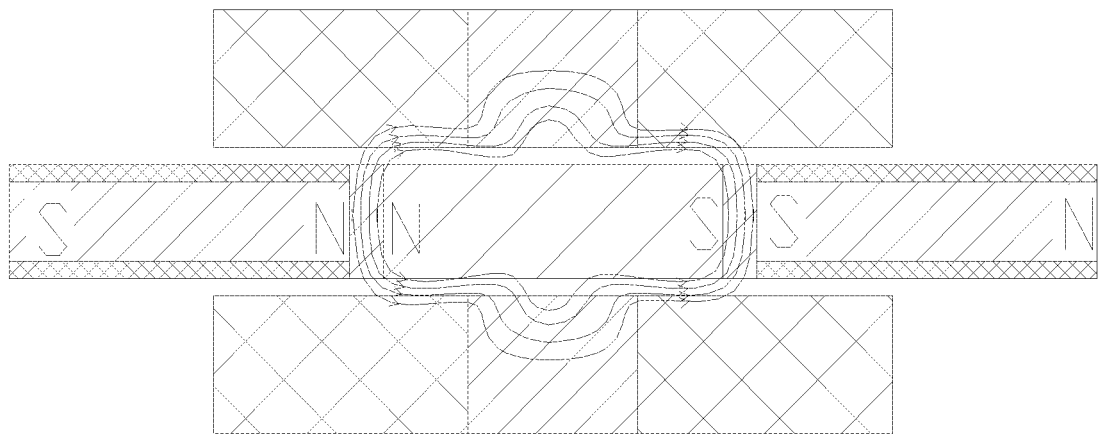
FIG. 7a and FIG. 7b are schematic diagrams illustrating the driving principle of the linear vibration motor according to the third embodiment of the present invention.
Figure 7B:
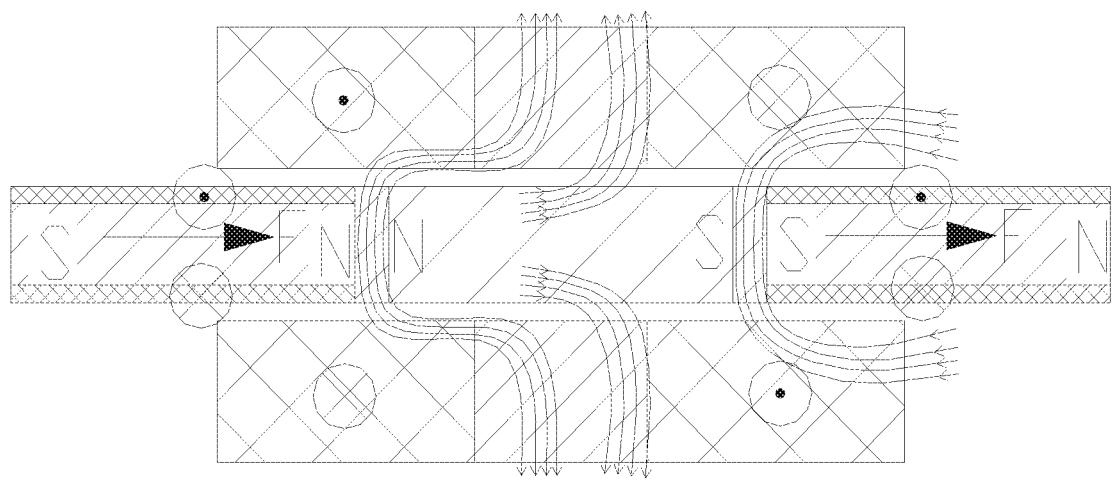
Figure 8A:
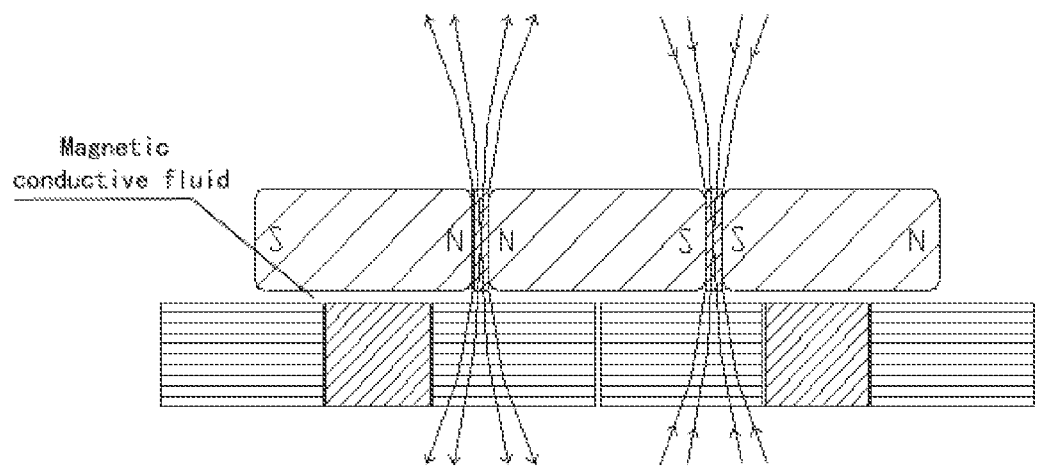
FIGS. 8a to 8d are schematic diagrams each of which illustrates an assembled structure of a vibration block and a stator according to an embodiment of the present invention.
Figure 8B:
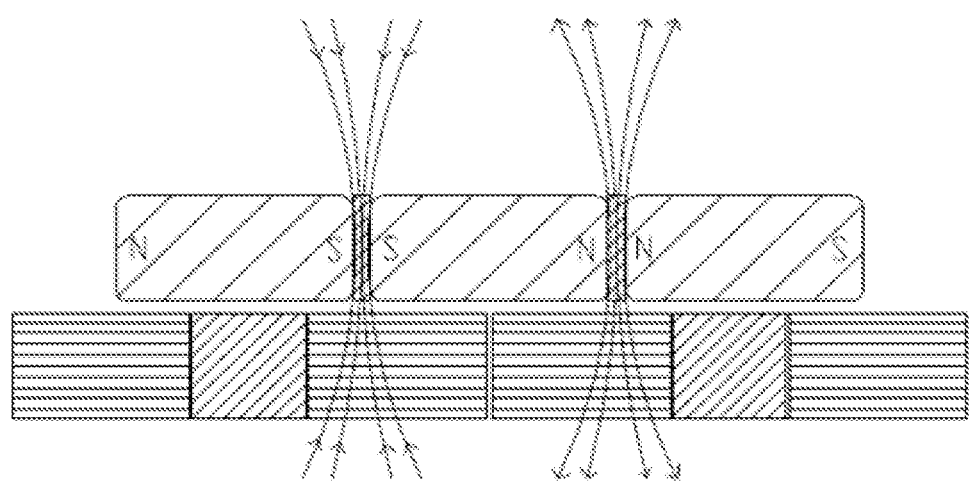
Figure 8C:
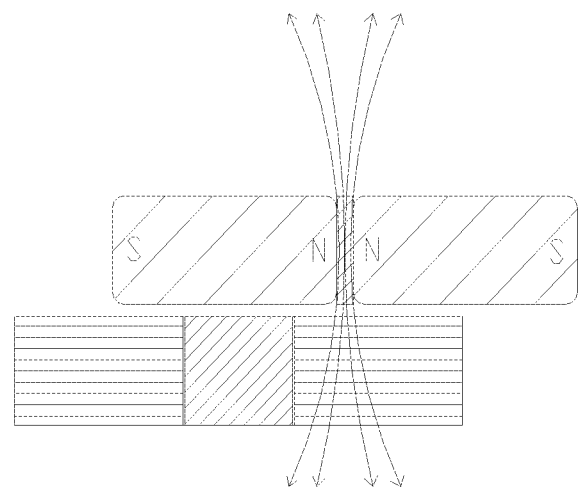
Figure 8D:
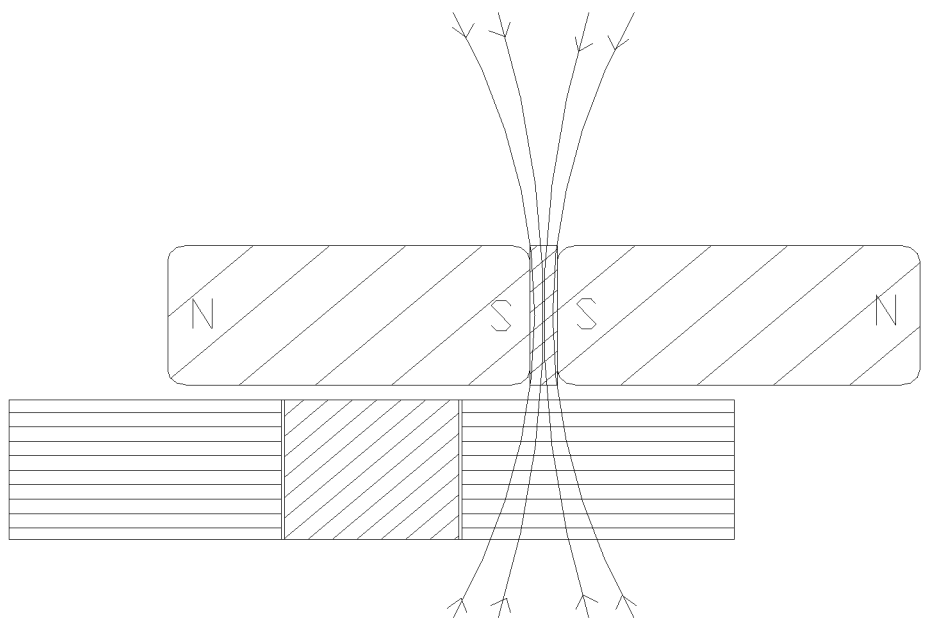

FIG. 6 and FIGS. 7a-7b respectively show a cross-sectional view of an assembled structure and a schematic diagram illustrating the driving principle of the linear vibration motor according to a third embodiment of the present invention.

Different from the first embodiment and the second embodiment, in the third embodiment, the three magnets constituting the vibration block are respectively an electromagnet, a permanent magnet, and an electromagnet. According to the schematic diagram of the vibration principle illustrated in FIGS. 7a and 7b, it can be seen that the two electromagnets located at two ends of the vibration block have the same charging direction, so that the adjacent ends of any one of the two electromagnets and the permanent magnet have the same polarities. That is, the three electromagnets constituting the vibration block illustrated in the drawings are arranged in the order of S-N, N-S, and S-N. The principle of vibration is the same as the above.

It should be noted that all of the linear vibration motors of the above three embodiments have a sandwich structure, that is, the arrangement of the stator and the vibrator in the vertical direction is "stator-vibrator-stator", as can be seen from the drawings, the stator includes stator coils correspondingly disposed at the upper and lower sides of the vibration block and magnetic conductive cores disposed in the stator coils. The coils correspondingly disposed at the upper and lower sides of the vibration block are parallel to each other, the axes thereof are located at the same straight line, and the current direction thereof are reverse to each other. However, the linear vibration motor of the present invention is not limited to the sandwich structure shown in the above embodiments, but may also be designed as a single side stator structure, i.e., the stator includes a stator coil disposed at one side of the vibration block and a magnetic conductive core disposed in the stator coil. The magnetization direction of the permanent magnet in the vibration block is perpendicular to the axis direction of the stator coil. The number, the type (electromagnet, permanent magnet, magnetic conductive core, etc.), and the combination manner of the member(s) of the stator, as well as the number, the type (electromagnet, permanent magnet, magnetic conductive core, etc.), and the combination manner of permanent magnets constituting the vibration block, can be selected according to the required magnitude of the vibration force of the product to which the linear vibration motor is applied. More assembled structure of the vibration block and the stator are shown in FIGS. 8a to 8d.

In addition, in a preferred embodiment of the present invention, an additional push-pull mechanism may be provided at two ends of the vibration block of the linear vibration motor, so as to provide driving force for the reciprocation motion of the vibrator in a direction parallel to the plane where the stator is located by using the interaction force of the push-pull magnet fixed to the counterweight block and the push-pull coil fixed to the housing.

Specifically, as shown in the embodiments of FIGS. 1-3, the push-pull magnets 4 are symmetrically disposed at two ends of the vibrator, and push-pull coils 2 surrounding the push-pull magnets 4 are fixedly disposed on the housing at positions corresponding to the push-pull magnets 4, and the push-pull coils 2 are wound around the push-pull coil bobbins 3. After the push-pull coils 2 are energized, the push-pull coils 2 and the push-pull magnets 4 generate push-pull forces in the horizontal direction, to provide a driving force for the reciprocating motion of the vibrator in a direction parallel to the plane in which the stator is located.

According to the vibration principle of the conventional motor, after the coil in the stator is energized, the permanent magnet in the vibration block and the coil in the stator generate interactional push-pull forces, and the direction of the magnetic field lines generated by the stator is changed by changing the direction of the current in the coil of the stator to drive the vibrator to reciprocally move in a direction parallel to the plane where the stator is located. However, in the micro vibration motor, due to the limitation on the volume of the micro vibration motor, the driving force that the original driving portion can provide is extremely limited. In the present invention, however, the driving structure composed of the push-pull magnets additionally provided at two ends of the vibrator and the push-pull coils fixed on the housing can provide an additional driving force for the micro vibration motor, thereby effectively improving the vibration force of the micro vibration motor without increasing the volume of the micro vibration motor.

Figure 9:
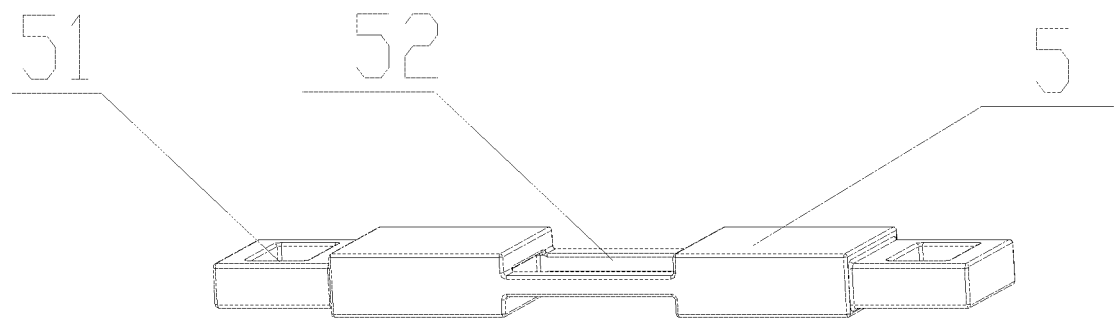
FIG. 9 is a schematic diagram illustrating the structure of a counterweight block according to an embodiment of the present invention.

FIG. 9 shows the structure of a counterweight block according to an embodiment of the present invention.

As shown in FIG. 9, the counterweight block 5 is an integral structure. In the middle of the counterweight block 5, a receiving groove 52 for accommodating the vibration block is disposed. At two ends of the counterweight block, grooves 51 for accommodating the push-pull magnets are disposed. In addition, an avoiding structure for avoiding the stator may be provided in the middle of the counterweight block at a corresponding position, and the receiving groove 52 for accommodating the vibration block is located at the center of the avoiding structure. In the specific process of assembling the counterweight block, the permanent magnets and the magnetic conductive yokes constituting the vibration block may be first fixed together, and then the vibration block may be integrally fixed in the receiving groove 52 by means of gluing or laser welding. The magnet 4 can also be fixed in the groove 51 in a similar manner. In addition, in the embodiments illustrated in FIGS. 1 and 2, the push-pull magnet 4 is an integrated permanent magnet that is magnetized in horizontal direction, and the axial direction of the push-pull coil 2 is parallel to the magnetization direction of the push-pull magnet 4.

The counterweight block 5 may be made of a tungsten steel block or a nickel steel block, or a high density metal material such as a nickel-tungsten alloy to increase the vibration force and make the vibration of the electronic product more intense.

It can be seen from FIG. 2, FIG. 4, FIG. 6, and FIG. 9 that, since the grooves 51 accommodating the push-pull magnets are provided at two ends of the counterweight block 5, the additional push-pull magnet does not increase the length or thickness of the vibrator. The push-pull coils surrounding the push-pull magnets are fixed on the housing by utilizing the avoiding space in the conventional motor structure without increasing the volume of the micro vibration motor.

In order to prevent the magnetic field lines generated by the push-pull magnet 4 from being too dispersed and affecting the magnetic density passing through the push-pull coil, in a preferred embodiment of the present invention, a magnetic conductive block is fixedly attached to a surface of the push-pull magnet 4 from which magnetic field lines of the push-pull magnet 4 are emitted to concentrate the magnetic field lines emitted from the push-pull magnet 4, so that the magnetic forces generated by the push-pull magnet are concentratedly conducted to the push-pull coil, and the utilization ratio of the magnetic field generated by the push-pull magnet 4 is increased.

In the foregoing embodiments, the push-pull magnet 4 is composed of an integral permanent magnet. However, in an actual application design, the push-pull magnet can also be designed as an electromagnet or a combined structure of a plurality of permanent magnets or magnets. For example, the push-pull magnet can be designed to include two permanent magnets disposed adjacently and a magnetic conductive core disposed between the adjacent permanent magnets, and the adjacent ends of two adjacent permanent magnets have the same polarities.

In the embodiments of the present invention, vibration reduction and collision avoidance of the vibrator during vibration are achieved through elastic pieces disposed at two ends of the vibrator. As shown in FIGS. 1-3, the elastic piece 10 is limited and located between the vibrator and the housing, and the vibrator squeezes the elastic piece at one end during vibration. The squeezed elastic piece can prevent the vibrator from colliding with the housing during vibration. At the same time, the squeezed elastic piece can also provide the elastic restoring force in the opposite direction for the vibration of the vibrator.

In the above embodiments, the magnetic conductive yoke in the vibration block and the corresponding magnetic conductive core in the stator are arranged in a misaligned manner, and the horizontal distance d between the magnetic conductive yoke in the vibration block and the magnetic conductive core in the stator corresponding to the magnetic conductive yoke is in a numeric range of 0.1 mm to 0.3 mm. That is, the horizontal distance between the centerline of each magnetic conductive yoke and the centerline of the corresponding (i.e., the nearest) magnetic conductive core of the stator is 0.1 to 0.3 mm. Then, the left-right offset distance between the center axis of the vibration block when the vibration block drives the counterweight block to move reciprocally and the center axis of the vibration block in stationary state is 0.2 mm. Accordingly, the distance from the edge of the avoiding structure to the outer edge of the stator should be slightly larger than 0.2 mm.

In addition, the linear vibration motor provided by the present invention further includes a flexible printed circuit board (PFCB). The stator may be fixed on the FPCB. The stator coil leads are connected to the external circuit through the circuit on the FPCB, and the FPCB is fixed to the housing.

The linear vibration motor according to the present invention is described by referring to the appended drawings. However, it should be understood for those skilled in the art that various modifications can be made to the linear vibration motor provided by the present invention without departing from the scope of the present invention, and the protection scope of the present invention should be defined by the appended claims.

What is claimed is:

1. A linear vibration motor, comprising a vibrator and a stator disposed in parallel with the vibrator, wherein the vibrator comprises a counterweight block and a vibration block embedded and fixed in the counterweight block, wherein
   the vibration block includes at least two magnets disposed adjacent to each other and a magnetic conductive yoke disposed between any two adjacent magnets, and adjacent ends of any two adjacent magnets have the same polarities, wherein
   the magnets are any combination of a permanent magnet and/or an electromagnet; and
   the stator includes stator coils disposed at one side of the vibrator or correspondingly disposed at upper and lower sides of the vibrator, and magnetic conductive cores disposed in the stator coils; and
   an axis direction of the stator coils is perpendicular to a magnetization direction of the magnets of the vibration block,
   wherein when the stator includes stator coils correspondingly disposed at upper and lower sides of the vibration block and magnetic conductive cores disposed in the stator coils, the stator coils correspondingly disposed at the upper and lower sides of the vibration block are parallel to each other and axes of the stator coils are located at the same straight line; and
   directions of currents in the stator coils correspondingly disposed at the upper and lower sides of the vibration block are reverse to each other.

2. The linear vibration motor of claim 1, wherein
   the vibration block includes three magnets disposed adjacent to each other; and
   the three magnets disposed adjacent to each other are electromagnets, or
   the three magnets disposed adjacent to each other are a permanent magnet, an electromagnet and a permanent magnet, respectively, or the three magnets disposed adjacent to each other are an electromagnet, a permanent magnet and an electromagnet, respectively.

3. The linear vibration motor of claim 1, wherein
   a horizontal distance d between each of the magnetic conductive yokes and the corresponding magnetic conductive core is within a numerical range of 0.1 mm to 0.3 mm.

4. The linear vibration motor of claim 1, wherein
   magnetic conductive fluid is filled between the vibration block and the stator.

5. The linear vibration motor of claim 1, wherein
   the counterweight block has an integral structure, and a receiving groove for receiving the vibration block is disposed at a middle portion of the counterweight block; and
   an avoiding structure for avoiding the stator is provided at a position of the counterweight block corresponding to the stator.

6. The linear vibration motor of claim 1, further comprising a housing, wherein
   the counterweight block has an integral structure, grooves are symmetrically arranged at two ends of the counterweight block, and push-pull magnets are received and fixed in the grooves, respectively; and
   push-pull coils surrounding the push-pull magnets are fixedly disposed on the housing at positions corresponding to the push-pull magnets, respectively.

7. The linear vibration motor of claim 6, further comprising push-pull coil bobbins, and the push-pull coils are wound on the push-pull coil bobbins, respectively.

8. The linear vibration motor of claim 6, wherein
   two ends of the counterweight block are respectively provided with an elastic piece; and
   the elastic piece is limited between the vibrator and the housing.

9. The linear vibration motor of claim 6, wherein
   each of the push-pull magnets is a permanent magnet that is magnetized horizontally; or
   each of the push-pull magnets includes two permanent magnets disposed adjacent to each other and a magnetic conductive core disposed between the two adjacent permanent magnets, and adjacent ends of the two adjacent permanent magnets have the same polarities.

* * * * *